United States Patent
Weeks

(10) Patent No.: US 7,846,552 B2
(45) Date of Patent: Dec. 7, 2010

(54) POLYMER COMPOSITIONS FOR EXTRUSION COATING

(75) Inventor: Ronald J. Weeks, Lake Jackson, TX (US)

(73) Assignee: Dow Global Technologies Inc., Midland, MI (US)

(*) Notice: Subject to any disclaimer, the term of this patent is extended or adjusted under 35 U.S.C. 154(b) by 820 days.

(21) Appl. No.: 10/528,610

(22) PCT Filed: Sep. 22, 2003

(86) PCT No.: PCT/US03/29620

§ 371 (c)(1),
(2), (4) Date: Mar. 21, 2005

(87) PCT Pub. No.: WO2004/026955

PCT Pub. Date: Apr. 1, 2004

(65) Prior Publication Data

US 2005/0256270 A1  Nov. 17, 2005

(51) Int. Cl.
 *B32B 27/00* (2006.01)
 *C08L 23/00* (2006.01)
 *C08F 297/02* (2006.01)
(52) U.S. Cl. .................. 428/500; 525/240; 525/242
(58) Field of Classification Search .............. 524/240; 428/515, 516
See application file for complete search history.

(56) References Cited

U.S. PATENT DOCUMENTS

| | | | |
|---|---|---|---|
| 3,645,992 A | 2/1972 | Elston | |
| 4,076,698 A | 2/1978 | Anderson et al. | |
| 5,008,204 A | 4/1991 | Stehling | |
| 5,246,783 A | 9/1993 | Spenadel et al. | |
| 5,582,923 A | 12/1996 | Kale et al. | |
| 5,587,247 A | 12/1996 | Kubo et al. | |
| 5,616,408 A * | 4/1997 | Oleszczuk et al. | 442/346 |
| 5,677,383 A * | 10/1997 | Chum et al. | 525/240 |
| 5,844,045 A | 12/1998 | Kolthammer et al. | |
| 5,879,768 A | 3/1999 | Falla et al. | |
| 6,306,969 B1 | 10/2001 | Patel et al. | |
| 6,339,134 B1 * | 1/2002 | Crowther et al. | 526/128 |
| 6,384,158 B1 * | 5/2002 | Bamberger et al. | 526/114 |
| 6,734,265 B1 * | 5/2004 | Dekmezian et al. | 526/119 |
| 7,094,472 B2 * | 8/2006 | Du Plessis et al. | 428/461 |
| 2004/0068848 A1 * | 4/2004 | Ausen et al. | 24/452 |
| 2004/0087750 A1 | 5/2004 | Agarwal et al. | |

FOREIGN PATENT DOCUMENTS

| | | | |
|---|---|---|---|
| JP | 57128729 A * | 8/1982 | |
| JP | 10-077374 | 3/1998 | |
| JP | 10168245 A * | 6/1998 | |
| WO | WO-93/03093 | 2/1993 | |

(Continued)

OTHER PUBLICATIONS

"The Role of Rheology in Polymer Extursion" John Vlachopoulos (McMaster University) Hamilton, Ontario, Canada.*

*Primary Examiner*—Kevin R. Kruer

(57) ABSTRACT

Compositions suitable for use in extrusion coating are claimed. The compostions comprise a mixture of a homogeneous ethylene polymer and a heterogeneous ethylene polymer together with a high melt strength polyolefin. Film layers made from the compositions have improved neck-in and excellent heat sealing characteristics.

23 Claims, 1 Drawing Sheet

FOREIGN PATENT DOCUMENTS

| WO | WO-9805731 | | 2/1998 |
| WO | WO-0110643 | A1 | 2/2001 |
| WO | 01/92403 | A3 * | 12/2001 |
| WO | WO-03/082971 | A2 | 10/2003 |
| WO | WO-2005/023912 | A2 | 3/2005 |
| WO | WO-2005/090464 | A1 | 9/2005 |

* cited by examiner

POLYMER COMPOSITIONS FOR EXTRUSION COATING

This application is a non-provisional 371 national phase patent application of International Patent Application No. PCT/US2003/029620, filed on Sep. 22, 2003, entitled "POLYMER COMPOSITIONS FOR EXTRUSION COATINGS", which claims priority from the U.S. Provisional Patent Application No. 60/412,843, filed on Sep. 23, 2002, entitled ""POLYMER COMPOSITIONS FOR EXTRUSION COATINGS," the teachings of which are incorporated by reference herein, as if reproduced in full hereinbelow.

BACKGROUND OF THE INVENTION

This invention relates generally to film compositions useful for extrusion coating applications, and more specifically to providing sealant layers for packaging applications.

There are many examples of polymer compositions useful for extrusion coating applications, including blends of linear low density polyethylene (LLDPE) with high pressure (free radical) low density polyethylene (LDPE). Extrusion coating is a means of coating a substrate with a particular polymer such that the substrate is providing functionality such as sealability to yet another substrate or to itself. Examples include juice packs, typically having an interior polymer extrusion coated onto a foil substrate where the polymer coating is then sealed (adhered) to itself. Extrusion coating is a very particular process where "neck-in" is important in forming the coating. "Neck-in" refers to the ability of the polymer formulation to retain its width, or its original dimensions after extrusion. Minimizing the "neck-in" allows for the polymer formulation to more effectively and uniformly coat the substrate.

For example, U.S. Pat. No. 5,587,247, the disclosure of which is incorporated herein by reference, discloses resin compositions for extrusion molding comprising a high pressure ethylene polymer having an endothermic peak in the range of 80°-120° C., an ethylene copolymer having an endothermic peak in the range of 118°-130° C. and an ethylene copolymer having, among other properties, no endothermic peak above 110 C.

However, there is still a need for a polymer formulation which reduces "neck-in" while maintaining good sealability.

BRIEF SUMMARY OF THE INVENTION

We have now discovered polymer compositions uniquely suited for extrusion coating having minimum "neck-in" and excellent sealing characteristics (for example, low heat seal initiation temperatures) and toughness properties. These compositions comprise (A) from 60 to 80 weight percent of a mixture of at least one homogeneously branched polyethylene and at least one heterogeneously branched polyethylene and (B) from 20 to 40 weight percent of at least one polymer having a melt strength at least twice that of mixture (A). A film layer made from these compositions is also within the scope of the invention.

In another embodiment of the invention, a film is made which comprises at least two layers, (A) one layer being made from a polymer composition, the composition comprising a mixture of at least one homogeneously branched polyethylene and at least one heterogeneously branched polyethylene and (B) one other layer comprising at least one other polymer having a melt strength at least twice that of the mixture of (A).

DETAILED DESCRIPTION OF THE INVENTION

Figure 1:
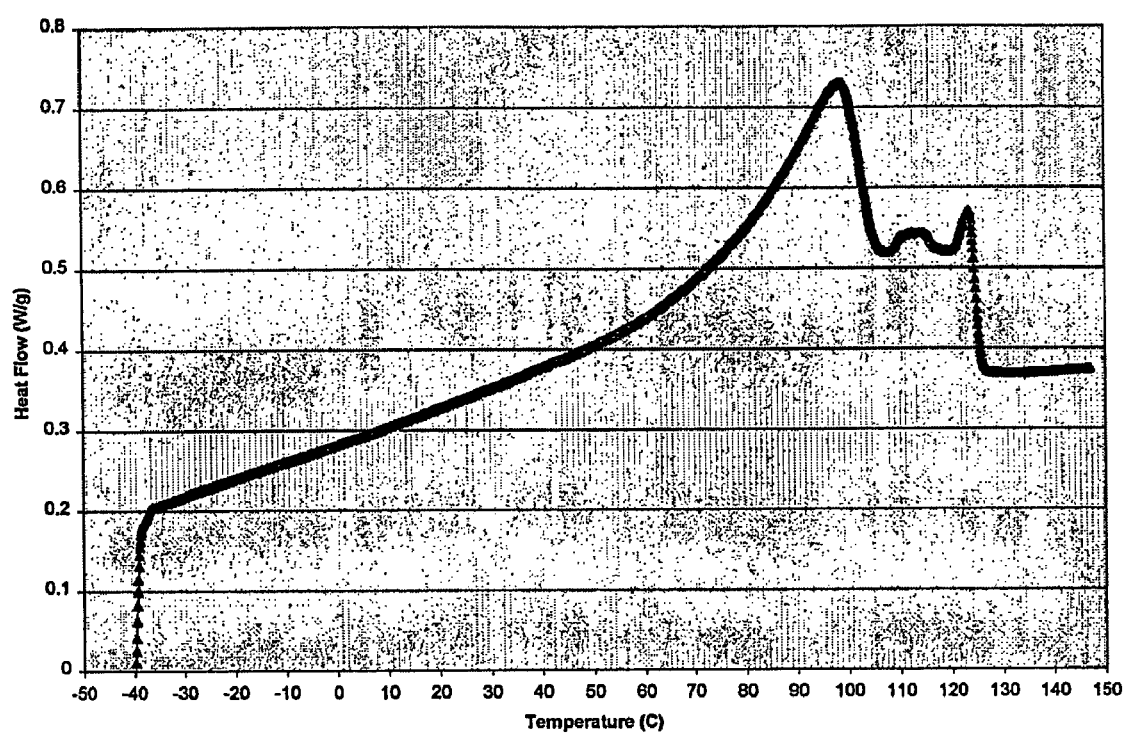
FIG. 1 shows a graph of differential scanning calorimetry (DSC) of the mixture (A) of the invention. Note that three distinct melting peaks are evident.

The polymer resins usable in this invention are polyethylenes, and for component (B) additionally polypropylene random copolymer (PPRCP), styrene/butadiene copolymers (SBC), polystyrene, ethylene-vinyl acetate copolymers (EVA) and cyclic/olefin copolymers (COC) can be used.

Polyethylenes usable to this invention fall into two broad categories, those prepared with a free radical initiator at high temperature and high pressure, and those prepared with a coordination catalyst at high temperature and relatively low pressure. The former are generally known as LDPE and are characterized by branched chains of polymerized monomer units pendant from the polymer backbone. LDPE polymers generally have a density between 0.910 and 0.940 g/cm$^3$. Polymer density is measured according to the procedure of ASTM D-792 herein unless otherwise noted.

Ethylene polymers and copolymers prepared by the use of a coordination catalyst, such as a Ziegler Natta or Phillips catalyst, are generally known as linear polymers because of the substantial absence of branch chains of polymerized monomer units pendant from the backbone. Linear copolymers of ethylene and at least one -olefin of 3 to 12 carbon atoms, preferably of 4 to 8 carbon atoms, are also well known and commercially available. As is well known in the art, the density of a linear ethylene/-olefin copolymer is a function of both the length of the -olefin and the amount of such monomer in the copolymer relative to the amount of ethylene, the greater the length of the -olefin and the greater the amount of -olefin present, the lower the density of the copolymer. LLDPE is a heterogeneous polymer, meaning that the comonomer is not evenly distributed along the polymer backbone. The branching distributions for heterogeneous ethylene polymers is broad due to the non-uniformity of branching. LLDPE is typically a copolymer of ethylene and an -olefin of 3 to 20 carbon atoms, preferably 4 to 8 carbon atoms (for example, 1-butene, 1-octene, etc.), that has sufficient -olefin content to reduce the density of the copolymer to that of LDPE (for example, 0.910 g/cm$^3$ to 0.940 g/cm$^3$). When the copolymer contains even more -olefin, the density will drop below about 0.91 g/cm$^3$ and these copolymers are known interchangeably as ultra low density polyethylene (ULDPE) or VLDPE. The densities of VLDPE or ULDPE polymers generally range from 0.87 to 0.91 g/cm$^3$. Both LLDPE and VLDPE or ULDPE are well known in the art, as are their processes of preparation. For example, heterogeneous LLDPE can be made using Ziegler-Natta catalysts in a slurry, gas phase, solution or high pressure process, such as described in U.S. Pat. No. 4,076,698 while homogeneous linear ethylene polymers can be made as described in U.S. Pat. No. 3,645,992. Homogeneous ethylene polymers have a uniform branching distribution, that is, substantially all the polymer molecules have the same amount of comonomer incorporated in each. Composition distribution branching indices (CDBI) have been used to characterize branching distributions (or homogeneity or heterogeneity) and can be determined in accordance with U.S. Pat. No. 5,246,783 using the device described in U.S. Pat. No. 5,008,204, the disclosure of each of which are incorporated herein by reference. CDBI for heterogeneous polymers is between 30 and 70, while the CDBI for homogeneous polymers is between 80 and can be as high as 100.

The polymer mixture (A) can be a physical blend of dry materials, with subsequent melt blending, or the mixture (A) can be made in-situ, as described and claimed in U.S. Pat. No. 5,844,045, the disclosure of which is incorporated herein by reference.

High density polyethylene (HDPE), generally having a density of 0.941 to 0.965 g/cm$^3$, is typically a homopolymer of ethylene, and it contains few branch chains relative to the various linear copolymers of ethylene and an -olefin. HDPE is well known, commercially available in various grades, and may be used in this invention.

The polypropylene copolymers of this invention are polymers comprising units derived from propylene and ethylene and/or one or more unsaturated comonomers. The term "copolymer" includes terpolymers, tetrapolymers, etc. "Random copolymer" means a copolymer in which the monomer is randomly distributed across the polymer chain. Typically, the polypropylene copolymers comprise units derived from propylene in an amount of at least 60, preferably at least 70 and more preferably at least 80, weight percent of the copolymer. Ethylene and/or the one or more unsaturated comonomers of the copolymer comprise at least 0.1, preferably at least 1 and more preferably at least 3, weight percent, and the typical maximum amount of unsaturated comonomer does not exceed 40, and preferably it does not exceed 30, weight percent of the copolymer. Such random copolymers of polypropylene are commercially available, for example, DOW PolyPropylene RESiNS™ available from The Dow Chemical Company.

Styrene/butadiene copolymers (SBC) are clear resins known in the art. SBC resins provide both high clarity and good film stiffness. Examples of suitable SBC resins are the K-Resin® family of SBC available from Chevron Phillips Chemical Company LP.

Cyclic-Olefin copolymers (COC) are amorphous, glass-clear copolymers of ethylene and norbornene made via metallocene catalysts. COC resins provide good stiffness and high clarity. COC is commercially available, for example, the Topas® COC copolymers available from Ticona.

Polystyrene is a transparent resin well known in the art and commercially available. Polystyrene provides both high-clarity and good film stiffness. An example of a suitable, commercially available polystyrene is Styron™ 663 polystyrene available from The Dow Chemical Company.

Ethylene-vinyl acetate copolymers are well-known, commercially available elastomers.

Preferably, the mixture of (A) comprises from about 40 to about 75 weight percent of the homogeneously branched polyethylene and from about 25 to about 60 weight percent of the heterogeneously branched polyethylene. The heterogeneously branched polyethylene has a molecular weight distribution, Mw/Mn, from about 3 to about 6 and the homogeneously branched polyethylene has a molecular weight distribution, Mw/Mn, from about 1.5 to about 3. The mixture of (A) can have a melt index, I2, from about 6 grams/10 minutes to about 20 grams/10 minutes. Melt index (I2) is measured in accordance with ASTM D 1238, Condition 190 C/2.16 kg. The mixture of (A) also can have a density of from about 0.88 grams/cubic centimeter to about 0.92 grams/cubic centimeter. The mixture of (A) has at least 3 melting peaks on a differential scanning calorimetry curve. Preferably, the mixture of (A) comprises from about 50 to about 60 weight percent of the homogeneously branched polyethylene and from about 40 to about 50 weight percent of the heterogeneously branched polyethylene.

Component (B) can be selected from the group consisting of low density polyethylene, ethylene/carboxylic acid copolymers, ionomers of ethylene/carboxylic acid copolymers, ethylene vinyl acetate copolymers, high melt strength polypropylene homopolymer, and high melt strength polypropylene copolymer. Component (B) should have a melt strength at least twice that of mixture (A), with even greater melt strengths, such as about 2.5 times the melt strength of mixture (A), about 3 times the melt strength of mixture (A) or even greater, also contemplated.

While not being bound by any particular theory, it is believed that the benefit of the triple phase polymer (three melting peaks) is that it enables sealing with low heat seal initiation temperature due to the high percentage of the first peak (that is, the major peak which occurs at the lowest temperature), while the second and third peaks contribute to an overall heat resistance as expressed by Vicat Softening temperature.

Preferably component (A) comprises about 60 to about 80 weight percent of the composition and component (B) comprises about 20 to about 40 weight percent of the composition. Additives commonly used in the art, such as antioxidants may also be used advantageously in the compositions of the present invention.

In another embodiment, a film layer is made from a polymer composition, the composition comprising (A) from about 60 to about 80 weight percent of a mixture of at least one homogeneously branched polyethylene and at least one heterogeneously branched polyethylene and (B) from about 20 to about 40 weight percent of at least one polymer having a melt strength at least twice that of mixture (A).

The inventive film layers are suitable for use in juice packs, snack packaging and vertical/form/fill/seal applications, among others.

Examples

The following resins were used in the production of the films of the Examples.

LDPE having a melt index, $I_2$, of 2.3 g/10 min (measured by ASTM D-1238, Condition 190 C/2.16 kg)), a density of 0.918 g/cm$^3$ (measured by ASTM D-792), a melt tension of 8 grams measured according to the method previously described in the Detailed Description of the Invention, and having 300 ppm of a hindered phenolic antioxidant (in this example, Irganox 1010 available from Ciba Geigy)

Mixture (A) A mixture of 56 weight percent of a homogeneous ethylene polymer having a melt index, $I_2$, of 20 g/10 min (measured by ASTM D-1238, Condition 190 C/2.16 kg) and a density of 0.903 g/cm$^3$ (measured by ASTM D-792)) and 44 weight percent of a heterogeneous ethylene polymer such that the resultant mixture has a final melt index of 20 grams/10 minutes and a density of 0.907 grams/cubic centimeter.

The formulations were run on an extrusion coating line equipped with a 3.5" extruder (9 cm) (32 L/D) run with the following zone temperatures:

| | | | | | | | |
|---|---|---|---|---|---|---|---|
| Barrel 1 | 200 | Barrel 2 | 250 | Barrel 3 | 280 | Barrel 4 | 290 |
| Barrel 5 | 290 | Barrel 6 | 290 | Flange | 290 | | |
| Pipe zones 1 to 3 | 290 | Feedblock zones 1-3 | 290 | | | | |
| Die zones 1 to 10 | 290 | | | | | | |
| Neck-in (mm): | | | | | | | |
| Drawdown (m/min): | | | | | | | |

The Differential Scanning Calorimetry (DSC) measurements were performed in a nitrogen atmosphere using a TA Q-1000 differential scanning calorimeter. Each sample was melted by rapidly heating at about 100° C./min. to 180° C., allowed to remain at 180° C. for 3 minutes, cooled at 10° C./min. to −40° C., and the conventional DSC endotherm recorded by scanning from −40° C. to 150° C. at 10° C./min. The temperature cycle settings appropriate for polymers other than LLDPE may be found in ASTM D-3417 and ASTM D-3418.

Vicat Softening may be measured according to ASTM D1525 or ISO 306.

Melt Strength is measured using a Goettfert Rheotens capillary rheometer to supply molten polymer at a temperature of 190° C. and at a rate of 30.26 mm$^3$/sec to a die with an inside diameter of 2.1 mm, a die length of 41.9 cm, and an entrance angle of 90 degrees. The piston diameter is 9.54 mm, the piston velocity is 0.423 mm/sec, the shear rate is 33 sec$^{-1}$, the draw down is 100 mm. The melt is then pulled with the wheels of a Goettfert Rheotens Model 71.97 extensional rheometer with an air gap of 10 cm and an acceleration rate of 2.4 mm$^2$/sec. The Melt Strength is the plateau value of the force in the spinline measured in centinewtons (cN), or the peak value in the case of a lack of a plateau, as is often experienced with high strength materials.

The tensile properties of the polymers were measured using ISO 527-3 or an equivalent standard test method. Tensile properties include 2 percentSecant Modulus, Maximum Tensile Strength, and Percent Elongation at Maximum Tensile Strength. A J&B Topwave was used to determine the Hot Tack Initiation Temperature according to ASTM D-3706 and was also used to make the heat seals. The heat sealer was equipped with 5 mm wide Teflon coated heat seal bars and the seals were made using 0.5 Newtons/mmA^2 seal bar pressure and 0.5 second dwell time. After a 2 second delay following the making of the heat seals, an Instron universal tester was used to measure the Heat Seal Strength according to ASTM D-88. A Sentinel or a Lloyd K instrument with may be used to measure Heat Seal Initiation Temperature.

Draw down is a measure of the drawability (Table #?) of a polymer and thus serves as an indicator of how thin a polymer can be drawn in a stable web configuration. Draw down is determined by first establishing the stable coating weight and the line speed equivalent to a constant extrusion output under set process conditions as shown in the Table. The draw down speed is measured by maintaining constant extrusion output while increasing the line speed until a classified web defect occurs. Webb defects classified as melt drawing limiting included edge tear, web tear, and edge waving beyond +/−3 mm ion either side of the web.

What is claimed is:

1. A polymer composition comprising
   (A) from 60 to 80 weight percent of a mixture of at least one homogeneously branched polyethylene and at least one heterogeneously branched polyethylene wherein the mixture of (A) comprises from 40 to 75 weight percent of the homogeneously branched polyethylene and from 25 to 60 weight percent of the heterogeneously branched polyethylene and
   (B) from 20 to 40 weight percent of at least one low density polyethylene polymer having a melt strength at least twice that of mixture (A).

2. The composition of claim 1 wherein the homogeneously branched polyethylene is an interpolymer of ethylene and at least one $C_3$-$C_{20}$ alpha-olefin.

3. The composition of claim 1 wherein the heterogeneously branched polyethylene has a molecular weight distribution, Mw/Mn, from 3 to 6.

4. The composition of claim 1 wherein the mixture of (A) has a melt index, $I_2$ (ASTM D-1238 condition 190° C./2.16 Kg), from 10 grams/10 minutes to 30 grams/10 minutes.

5. The composition of claim 1 wherein the mixture of (A) has a density (ASTM D-792) of from 0.88 grams/cubic centimeter to 0.92 grams/cubic centimeter.

6. The composition of claim 1 wherein the homogeneously branched polyethylene has a molecular weight distribution, Mw/Mn, from 1.5 to 3.

7. The composition of claim 1, wherein the mixture of (A) comprises from 50 to 60 weight percent of the homogeneously branched polyethylene and from 40 to 50 weight percent of the heterogeneously branched polyethylene.

8. The composition of claim 1 wherein the homogeneously branched polyethylene has a composition distribution branching index between 80 and 100.

9. The composition of claim 1 wherein the mixture of (A) has at least 3 melting peaks on a differential scanning calorimetry curve.

10. The composition of claim 9 wherein the mixture of (A) has only 3 melting peaks on a differential scanning calorimetry curve.

11. A polymer composition comprising
    (A) from 60 to 80 weight percent of an ethylenic polymer having at least three melting peaks on a differential scanning calorimetry curve and
    (B) from 20 to 40 weight percent of at least one low density polyethylene polymer having a melt strength at least twice that of (A).

12. A film layer made from a polymer composition, the composition comprising
    (A) from 60 to 80 weight percent of a mixture of at least one homogeneously branched polyethylene and at least one heterogeneously branched polyethylene wherein the mixture of (A) comprises from 40 to 75 weight percent of the homogeneously branched polyethylene and from 25 to 60 weight percent of the heterogeneously branched polyethylene and
    (B) from 20 to 40 weight percent of at least one low density polyethylene polymer having a melt strength at least twice that of mixture (A).

13. The film layer of claim 12, wherein the homogeneously branched polyethylene is an interpolymer of ethylene and at least C3-C20 alpha-olefin.

14. The film layer of claim 12, wherein the heterogeneously branched polyethylene has a molecular weight distribution, Mw/Mn, from 3 to 6.

15. The film layer of claim 12, wherein the mixture of (A) has a melt index, $I_2$ (ASTM D-1238 condition 190° C./2.16 Kg), from 10 grams/10 minutes to 30 grams/10 minutes.

16. The film layer of claim 12, wherein the mixture of (A) has a density (ASTM D-792) of from 0.88 grams/cubic centimeter to 0.92 grams/cubic centimeter.

17. The film layer of claim 12, wherein the homogeneously branched polyethylene has a molecular weight distribution, Mw/Mn, from 1.5 to 3.

18. The film layer of claim 12, wherein the mixture of (A) comprises from 50 to 60 weight percent of the homogeneously branched polyethylene and from 40 to 50 weight percent of the heterogeneously branched polyethylene.

19. A fabricated article comprising the film layer of claim 12.

20. The film layer of claim 12 further comprising at least one other layer.

21. The film layer of claim 12, wherein the mixture of (A) has at least 3 melting peaks on a differential scanning calorimetry curve.

22. The film layer of claim 21, wherein the mixture of (A) has only 3 melting peaks on a differential scanning calorimetry curve.

23. A film comprising at least two layers, one layer being made from a polymer composition, the composition comprising:

(A) a mixture of at least one homogeneously branched polyethylene and at least one heterogeneously branched polyethylene wherein the mixture of (A) comprises from 40 to 75 weight percent of the homogeneously branched polyethylene and from 25 to 60 weight percent of the heterogeneously branched polyethylene and one other layer comprising (B) at least one other low density polyethylene polymer having a melt strength at least twice that of the mixture of (A).

* * * * *